(12) United States Patent  
Xu et al.

(10) Patent No.: US 10,390,021 B2  
(45) Date of Patent: Aug. 20, 2019

(54) METHOD AND APPARATUS OF VIDEO CODING

(71) Applicant: MEDIATEK INC., Hsinchu (TW)

(72) Inventors: Xiaozhong Xu, State College, PA (US); Shan Liu, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/458,446

(22) Filed: Mar. 14, 2017

(65) Prior Publication Data

US 2017/0272757 A1    Sep. 21, 2017

Related U.S. Application Data

(60) Provisional application No. 62/359,822, filed on Jul. 8, 2016, provisional application No. 62/309,991, filed on Mar. 18, 2016.

(51) Int. Cl.

| | |
|---|---|
| *H04N 19/11* | (2014.01) |
| *H04N 19/105* | (2014.01) |
| *H04N 19/159* | (2014.01) |
| *H04N 19/172* | (2014.01) |
| *H04N 19/176* | (2014.01) |
| *H04N 19/182* | (2014.01) |
| *H04N 19/186* | (2014.01) |

(52) U.S. Cl.
CPC ......... *H04N 19/159* (2014.11); *H04N 19/105* (2014.11); *H04N 19/11* (2014.11); *H04N 19/172* (2014.11); *H04N 19/176* (2014.11); *H04N 19/182* (2014.11); *H04N 19/186* (2014.11)

(58) Field of Classification Search
CPC .................................................. H04N 19/105
See application file for complete search history.

(56) References Cited

U.S. PATENT DOCUMENTS

| 8,605,784 B2 | 12/2013 | Min et al. |
|---|---|---|
| 8,665,950 B2 | 3/2014 | Min et al. |
| 8,787,458 B2 | 7/2014 | Min et al. |
| 8,989,266 B2 | 3/2015 | Min et al. |
| 9,036,703 B2 | 5/2015 | Min et al. |
| 9,049,458 B2 | 6/2015 | Min et al. |
| 9,071,839 B2 | 6/2015 | Min et al. |

(Continued)

FOREIGN PATENT DOCUMENTS

WO    WO 2015/057947 A1    4/2015

OTHER PUBLICATIONS

International Search Report and Written Opinion dated Jun. 1, 2017 in PCT/CN2017/077022.

*Primary Examiner* — Tracy Y. Li

(74) *Attorney, Agent, or Firm* — Oblon, McClelland, Maier & Neustadt, L.L.P.

(57) ABSTRACT

Aspects of the disclosure include a method for video coding. The method includes receiving input data associated with a current block in an image frame, selecting a reference pixel set from a plurality of candidate neighboring pixel sets adjacent to an edge of the current block, generating an intra predictor of the current block based on the selected reference pixel set and an intra prediction mode of the current block, and encoding or decoding the current block based on the intra predictor to output encoded video data or a decoded block. Each set of the candidate neighboring pixel sets is arranged in parallel with the edge of the current block.

20 Claims, 8 Drawing Sheets

(56) References Cited

U.S. PATENT DOCUMENTS

| | | |
|---|---|---|
| 9,374,591 B2 | 6/2016 | Min et al. |
| 2008/0107175 A1 | 5/2008 | Han et al. |
| 2010/0027655 A1* | 2/2010 | Matsuo ................ H04N 19/176 375/240.13 |
| 2010/0166327 A1* | 7/2010 | Goel .................... H04N 19/105 382/236 |
| 2011/0038415 A1 | 2/2011 | Min et al. |
| 2012/0140824 A1 | 6/2012 | Min et al. |
| 2013/0028530 A1* | 1/2013 | Drugeon .............. H04N 19/136 382/233 |
| 2013/0272401 A1 | 10/2013 | Seregin et al. |
| 2013/0272623 A1* | 10/2013 | Jeon .................... H04N 19/159 382/238 |
| 2013/0315303 A1 | 11/2013 | Min et al. |
| 2013/0315311 A1* | 11/2013 | Song ................... H04N 19/105 375/240.16 |
| 2013/0329791 A1 | 12/2013 | Min et al. |
| 2014/0092980 A1* | 4/2014 | Guo ................ H04N 19/00696 375/240.16 |
| 2014/0254673 A1 | 9/2014 | Min et al. |
| 2015/0055699 A1 | 2/2015 | Min et al. |
| 2015/0110174 A1 | 4/2015 | Gu et al. |
| 2015/0117530 A1 | 4/2015 | Min et al. |
| 2015/0249834 A1 | 9/2015 | Min et al. |
| 2016/0073114 A1* | 3/2016 | Kawamura ............ H04N 19/12 375/240.03 |

\* cited by examiner

METHOD AND APPARATUS OF VIDEO CODING

INCORPORATION BY REFERENCE

This present disclosure claims the benefit of U.S. Provisional Application No. 62/309,991, "Methods for intra prediction in image and video compression" filed on Mar. 18, 2016 and U.S. Provisional Application No. 62/359,822, "Methods for intra prediction with multiple reference lines in image and video compression" filed on Jul. 8, 2016, which are incorporated herein by reference in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many video coding standards divide an image frame of an input video into one or more coding units that can further include at least a prediction unit (or a block) that correspond to luma or chroma components of the image frame. When encoding an original image of a block, the original image of the block can be divided into a predictable portion (also referred to as a predictor) and a residual portion of the block according to a predetermined video coding standard. When decoding the block, a reconstructed image of the block can be obtained by generating and combining the predictor and the residual portion of the block according to the same predetermined video coding standard.

In some applications, the predictor of a block can be generated based on the image(s) of other blocks and/or other frames. Such prediction scheme may reduce temporal redundancy in the encoded video data and is also known as an inter prediction. In some applications, the predictor of a block can be generated by extrapolating samples of neighboring pixels based on a selected one of plural predetermined prediction modes. Such prediction scheme may reduce spatial redundancy in the encoded video data and is also known as an intra prediction.

SUMMARY

Aspects of the disclosure provide a method for video coding. The method includes receiving input data associated with a current block in an image frame, selecting a reference pixel set from a plurality of candidate neighboring pixel sets adjacent to an edge of the current block, generating an intra predictor of the current block based on the selected reference pixel set and an intra prediction mode of the current block, and encoding or decoding the current block based on the intra predictor to output encoded video data or a decoded block. Each set of the candidate neighboring pixel sets is arranged in parallel with the edge of the current block.

In an embodiment, the method may further include extracting from the input data or including in the encoded video data information that indicates the selected reference pixel set. In another embodiment, the method may further include deriving the selected reference pixel set based on the intra prediction mode or a shape of the current block.

Also, the method may further include selecting a second reference pixel set from the candidate neighboring pixel sets. The selected reference pixel set defines a first reference line, and the second selected reference pixel set defines a second reference line. A direction of prediction of the intra prediction mode of the current block defines prediction reference lines. Generating the intra predictor may include determining a first sample value based on the selected reference pixel set, the first sample value corresponding to a first position where the first reference line and one of the prediction reference lines intersect, determining a second sample value based on the second selected reference pixel set, the second sample values corresponding to a second position where the second reference line and the one of the prediction reference lines intersect, and calculating a value of a pixel of the intra predictor that overlaps the one of the prediction reference lines based on a difference between the first sample value and the second sample value and one of the first sample value and the second sample value.

In an embodiment, determining the first sample value may include interpolating the first sample value between pixel values of at least two pixels of the selected reference pixel set that are adjacent to the first position. In an embodiment, selecting the reference pixel set from the candidate neighboring pixel sets may include selecting a closest one of the candidate neighboring pixel sets to the edge of the current block.

In one example, calculating the value of the pixel of the intra predictor may be based on an equation of $P=Ref1+W \cdot (Ref1-Ref2)$, where P is the value of the pixel of the intra predictor, Ref1 is the first sample value, Ref2 is the second sample value, and W is a multiplication factor.

In addition, the method may include selecting K reference pixel sets, including the selected reference pixel set, from the candidate neighboring pixel sets, K being a positive integer greater than 1. The K selected reference pixel sets define K reference lines, respectively. A direction of prediction of the intra prediction mode of the current block defines prediction reference lines. Generating the intra predictor includes determining K sample values based on the K selected reference pixel sets, respectively and calculating a value of a pixel of the intra predictor that overlaps the one of the prediction reference lines based on the K sample values. Each of the K sample values corresponding to a respective position where the respective reference line and one of the prediction reference line intersect.

In at least one embodiment, generating the intra predictor includes determining K sample values based on the K selected reference pixel sets, respectively, and calculating a value of a pixel of the intra predictor that overlaps the one of the prediction reference lines based on the K sample values.

Moreover, the method may further include deriving the intra prediction mode of the current block based on the selected reference pixel set.

Aspects of the disclosure can further provide a video coding apparatus that includes a processing circuit. The processing circuit is configured to receive input data associated with a current block in an image frame, to select a reference pixel set from a plurality of candidate neighboring pixel sets adjacent to an edge of the current block, to generate an intra predictor of the current block based on the selected reference pixel set and an intra prediction mode of the current block, and to encode or decode the current block based on the intra predictor to output encoded video data or a decoded block. Each set of the candidate neighboring pixel sets is arranged in parallel with the edge of the current block.

Aspects of the disclosure further provide a non-transitory computer readable medium storing program instructions for causing a processing circuit of an apparatus to perform a video coding method. The method includes receiving input data associated with a current block in an image frame, selecting a reference pixel set from a plurality of candidate neighboring pixel sets adjacent to an edge of the current block, generating an intra predictor of the current block based on the selected reference pixel set and an intra prediction mode of the current block, and encoding or decoding the current block based on the intra predictor to output encoded video data or a decoded block. Each set of the candidate neighboring pixel sets is arranged in parallel with the edge of the current block.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
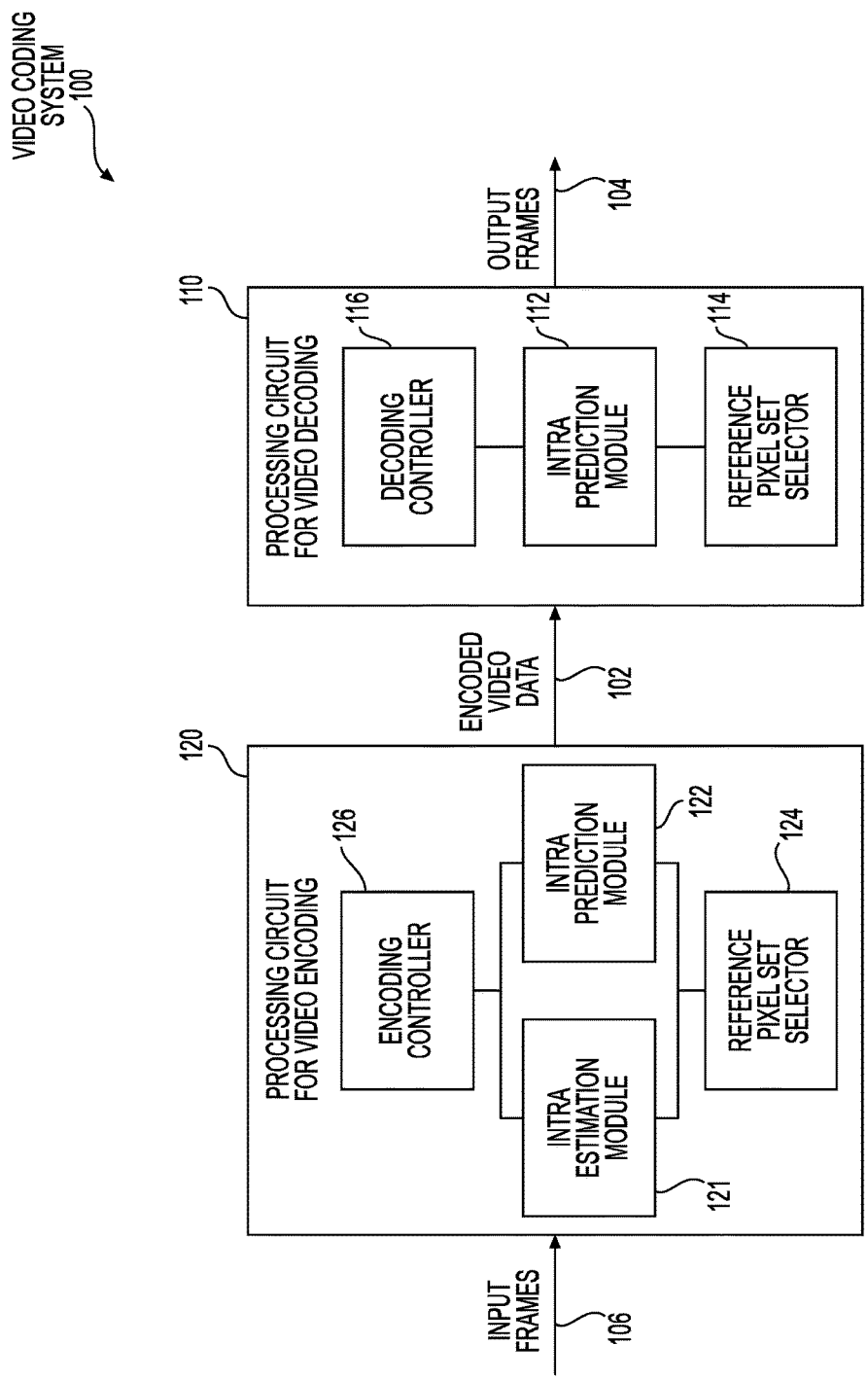
FIG. 1 shows an exemplary functional block diagram of a video coding system according to an embodiment of the disclosure.

FIG. 1 shows an exemplary functional block diagram of a video coding system 100 according to an embodiment of the disclosure. The video coding system 100 includes a processing circuit for video decoding (i.e., a decoding circuit) 110 and a processing circuit for video encoding (i.e., an encoding circuit) 120. The encoding circuit 120 receives input frames 106 as input data and generates encoded video data 102 by encoding the input frames 106. The decoding circuit 110 receives the encoded video data 102 as input data and generates output frames 104 by decoding the encoded video data 102. The video coding system 100 may be implemented by one or more video coding devices that can include the decoding circuit 110, the encoding circuit 120, or both the decoding circuit 110 and encoding circuit 120.

The decoding circuit 110 can include at least an intra prediction module 112, a reference pixel set selector 114, and a decoding controller 116. The intra prediction module 112 can generate an intra predictor of a block to be decoded (or a current block) in an image frame using an intra prediction. The reference pixel set selector 114 can select at least one horizontal reference pixel sets from a first plurality of candidate neighboring pixel sets that is adjacent to and in parallel with an upper edge of the current block and/or at least one vertical reference pixel set from a second plurality of candidate neighboring pixel sets adjacent to and in parallel with a left edge of the current block. The decoding controller 116 can oversee the decoding of the encoded video data 102, including determining whether to use the intra prediction module 112 to decode the current block and/or controlling the operation of the intra prediction module 112 and the reference pixel set selector 114.

In operation, the decoding controller 116 receives the encoded video data 102 associated with the current block and extracts information therefrom regarding whether to use the intra prediction module 112, the corresponding intra prediction mode, and/or the selected reference pixel sets for generating the intra predictor of the current block. The selected reference pixel sets may be used by the intra prediction module 112 to generate the intra predictor, to derive gradient filtering parameters for filtering a raw intra predictor, to calculate a pixel value of the lower-right corner pixel of the intra predictor, to derive the intra prediction mode for generating the intra predictor, any combination thereof, or the like.

The selected reference pixel sets can be explicitly specified in the encoded video data 102 or derived based on the encoded video data 102 and a predetermined video coding standard. A selected reference pixel set may be derived based on the intra prediction mode, a size, or a shape of the current block. In some examples, when the current block is a chroma block, a selected reference pixel set may be explicitly provided, derived based on a selected reference pixel set for a luma block that corresponds to the chroma block, or inferred as a neighboring reference pixel set that is immediately adjacent to an edge of the chroma block.

The selected reference pixel sets can be signaled using syntax element(s) at the block level. Also, the selected reference pixel sets can be signaled only when a size of the current block is greater than a predetermined threshold. In some examples, the size of the current block is measurable based on a pixel area of the block, a size of the corresponding edge of the block, a size of the longer side edge of the block, and/or a size of the shorter side edge of the block. In some examples, selecting one or more reference pixel sets from plural candidate neighboring sets as described in the present application may only applicable to luma blocks or the edges of chroma blocks with a size greater than a threshold, while the chroma blocks, or the edges of chroma blocks having a size equal to or less than the threshold may automatically use the reference pixel sets that are closest to the corresponding edges.

The intra prediction mode can also be explicitly specified in the encoded video data 102 or derived based on the encoded video data 102 and the predetermined video coding standard. The intra prediction mode can be derived using any applicable approaches. In at least one example, the intra prediction mode can be derived based on a decoded portion of the image frame as a reference template and the selected reference pixel sets.

The encoding circuit 120 can include at least an intra estimation module 121, an intra prediction module 122, a reference pixel set selector 124, and an encoding controller 126. The intra estimation module 121 can analyze the input frames 106 and determine prediction parameters for encoding a block (or a current block) in an image frame using an intra prediction. The prediction parameters may include an intra prediction mode for generating an intra predictor of the current block and/or the selected reference pixel sets for generating the intra predictor. The reference pixel set selector 124 can work with the intra estimation module 121 to select at least one horizontal reference pixel sets from a first plurality of candidate neighboring pixel sets that is adjacent to and in parallel with an upper edge of the current block and/or at least one vertical reference pixel set from a second plurality of candidate neighboring pixel sets adjacent to and in parallel with a left edge of the current block.

The prediction parameters selected or identified by the intra estimation module 121 may be forwarded to the encoding controller 126, and the encoding controller 126 may determine whether to encode the current block using the intra prediction and encode the prediction parameters as part of the encoded video data 102 if the current block is to be coded using the intra prediction.

The prediction parameters selected or identified by the intra estimation module 121 may also be forwarded to the intra prediction module 122 to generate the intra predictor of the current block. The intra prediction module 122 can generate the intra predictor of the current block for further encoding process in a manner similar to the operation of the intra prediction module 112. Moreover, the encoding controller 126 can oversee the encoding of the current block, including determining whether to use the intra estimation module 121 and the intra prediction module 122 to encode the current block and/or controlling the operation of the intra estimation module 121, the intra prediction module 122, and the reference pixel set selector 124.

In operation, the encoding controller 126 may generate the encoded video data 102 associated with the current block by including information regarding whether to use the intra prediction, the corresponding intra prediction mode, and/or the selected reference pixel sets to be used for generating the intra predictor of the current block. The selected reference pixel sets may be used by the intra prediction module 112 of the decoding circuit 110 to generate the intra predictor, to derive gradient filtering parameters for filtering a raw intra predictor, to calculate a pixel value of the lower-right corner pixel of the intra predictor, any combination thereof, or the like. The selected reference pixel sets may also correspond to deriving the intra prediction mode for generating the intra predictor.

The selected reference pixel sets can be explicitly specified in the encoded video data 102 or derivable by the decoding circuit 110 based on the encoded video data 102 and a predetermined video coding standard. Whether to signal a selected reference pixel set may be determined based on the intra prediction mode, a size, or a shape of the current block. In some examples, when the current block is a chroma block, a selected reference pixel set may be explicitly provided or derived based on a selected reference pixel set for a luma block that corresponds to the chroma block.

The selected reference pixel sets can be signaled using syntax element(s) at the block level. Also, the selected reference pixel sets can be signaled only when a size of the current block, a size of the corresponding edge of the block, and/or a size of an edge of a neighboring block opposing the corresponding edge of the block is greater than a predetermined threshold. In some examples, selecting one or more reference pixel sets from plural candidate neighboring sets as described in the present application may only applicable to luma blocks or the edges of chroma blocks with a size greater than a threshold, while the chroma blocks, or the edges of chroma blocks having a size less than the threshold may automatically use the reference pixel sets that are closest to the corresponding edges.

The intra prediction mode can also be explicitly specified in the encoded video data 102 or derived based on the encoded video data 102 and the predetermined video coding standard, as described with reference to the encoding circuit 110.

Moreover, the prediction parameters selected or identified by the intra estimation module 121 may also be forwarded to the intra prediction module 122 to generate the intra predictor of the current block. The intra predictor may be further used to generate residue information for the current block. The residue information and the prediction parameters may be encoded and included in the encoded video data 102 by the encoding controller 126.

As illustrated above, in some examples, the selected reference pixel sets may be used by the decoding circuit 110 or the encoding circuit 120 to generate the intra predictor, to derive gradient filtering parameters for filtering a raw intra predictor, to calculate a pixel value of the lower-right corner pixel of the intra predictor, to derive the intra prediction mode for generating the intra predictor, or the like. Non-limiting examples with respect to these applications from the decoding perspective are further illustrated with reference to FIGS. 2-4, which would be applicable to corresponding applications from the encoding perspective.

Figure 2:
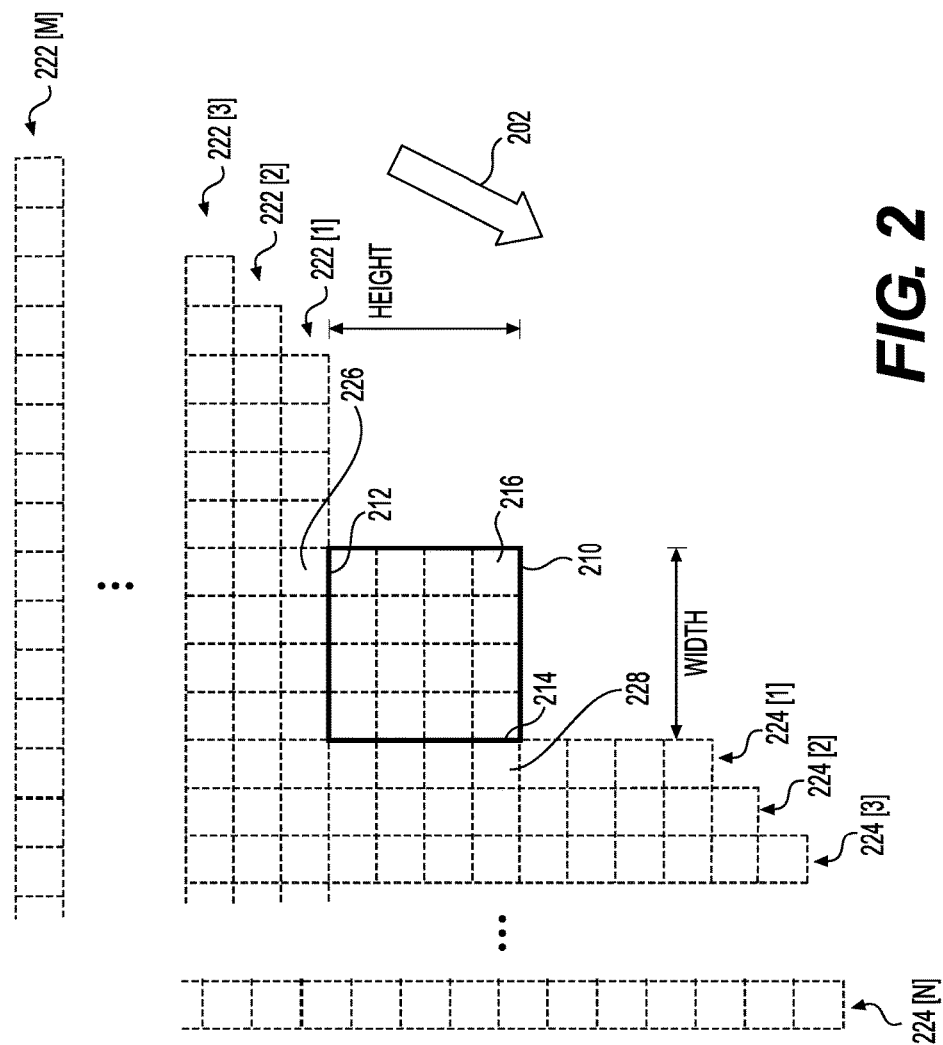
FIG. 2 shows a diagram illustrating selecting at least one first reference pixel set from a first plurality of candidate neighboring pixel sets adjacent to a first edge of a current block and selecting at least one second reference pixel set from a second plurality of candidate neighboring pixel sets adjacent to a second edge of the current block for generating an intra predictor of the current block according to an exemplary embodiment of the disclosure.

FIG. 2 shows a diagram illustrating selecting at least one horizontal reference pixel set from a first plurality of candidate neighboring pixel sets 222[1]-222[M] adjacent to an upper edge 212 of a current block 210 and selecting at least one vertical reference pixel set from a second plurality of candidate neighboring pixel sets 224[1]-224[N] adjacent to a left edge 214 of the current block 210 for generating an intra predictor of the current block 210 according to an exemplary embodiment of the disclosure.

The first plurality of candidate neighboring pixel sets 222[1]-222[M] corresponds to M rows of pixels that are adjacent to and in parallel with the upper edge 212. M is a predetermined integer greater than 1. The second plurality of candidate neighboring pixel sets 224[1]-224[N] corresponds to N rows of pixels that are adjacent to and in parallel with the left edge 214. N is a predetermined integer greater than 1. In some examples, M or N may range from 2 to 16. In some examples, M is equal to N.

Also, when a corresponding edge (e.g., upper edge 212 or left edge 214) has a size equal to or less than a predetermined threshold, selecting a reference pixel set from the corresponding plural candidate reference pixel sets may not be applicable, and the reference pixel set that is closest to the corresponding edge (e.g., reference pixel set 222[1] corresponding to the upper edge 212 or reference pixel set 224[1] corresponding to the left edge 214) may be used by default. In some examples, whether to select a reference pixel set from plural candidate reference pixel sets may be determined based on whether a size of the current block 210 is greater than a predetermined threshold. In some examples, the size of the current block is measurable based on a pixel area of the block, a size of the longer side edge of the block, and/or a size of the shorter side edge of the block.

The intra predictor of the current block 210 may be generated based on a selected one of available intra prediction modes that is signaled or derived from the encoded video data. The available intra prediction modes may be divided into three categories, including: (1) a first group of angular intra prediction modes (e.g., with a direction of prediction from a vertical direction to 45 degrees pointing to the lower-left direction) that requires only horizontal reference pixel set(s) corresponding to the upper edge 212; (2) a second group of angular intra prediction modes (e.g., with a direction of prediction from a horizontal direction to 45 degrees pointing to the upper right-left direction) that requires only vertical reference pixel set(s) corresponding to the left edge 214; and (3) a third group of angular intra prediction modes (e.g., with a direction of prediction between the vertical direction and the horizontal direction) and non-angular intra prediction modes that require both horizontal reference pixel set(s) and vertical reference pixel set(s).

In an example corresponding to category (1) discussed above, the intra predictor of the current block 210 may be generated based on an angular intra prediction mode having a direction of prediction 202 and at least one selected horizontal reference pixel set. When only one horizontal reference pixel set is needed for generating the intra predictor of the current block 210, any one of the M candidate neighboring pixel sets 222[1]-222[M] can be selected. When plural horizontal reference pixel sets are needed for generating the intra predictor of the current block 210, any combinations of the M candidate neighboring pixel sets 222[1]-222[M] can be selected in any order, and the selected horizontal reference pixel sets can be consecutive rows or non-consecutive rows.

In an example corresponding to category (2) or category (3) discussed above, the intra predictor of the current block 210 may be generated based on an angular prediction mode and at least one selected vertical reference pixel set, or based on an angular prediction mode or a non-angular selection mode and at least one selected horizontal reference pixel set and at least one selected vertical reference pixel set. The at least one selected vertical reference pixel set can be selected from the second plurality of candidate neighboring pixel sets 224[1]-224[N] that is adjacent to and in parallel with a left edge 214 of the current block 210 in a manner similar to selecting at least one selected vertical reference pixel set from the plurality of candidate neighboring pixel sets 222[1]-222[M].

When the angular intra prediction mode has a direction of prediction closer to a horizontal direction than a vertical direction, or when the current block has a height greater than a width thereof, the vertical reference pixel set(s) for generating the intra predictor may be selected from the plurality of candidate neighboring pixel sets 224[1]-224[N], while the horizontal reference pixel set may be set to a default choice and thus needs not to be signaled at the block level, such as the neighboring reference pixel set 222[1] that is closest to the upper edge 212. Similarly, when the angular prediction mode has a direction of prediction closer to the vertical direction than the horizontal direction, or when the current block has a width greater than a height thereof, the horizontal reference pixel set(s) for generating the intra predictor may be selected from the plurality of candidate neighboring pixel sets 222[1]-222[M], while the vertical reference pixel set may be set to a default choice and thus needs not to be signaled at the block level, such as the neighboring reference pixel set 224[1] that is closest to the left edge 214. In some examples, when two or more reference pixel sets are selected, the closest one of the candidate neighboring pixel sets (e.g., candidate neighboring pixel set 222[1] for upper edge 212 and/or candidate neighboring pixel set 224[1] for left edge 214) can be always selected by default as one of the selected reference pixel sets.

When two or more reference pixel sets corresponding to a particular edge are selected for generating the intra predictor, the intra predictor may be generated as a weighted combination of respective sample values derived from the two or more selected reference pixel sets. The corresponding weightings may be extracted from or included in the encoded video data 102. The corresponding weightings may be derived or predetermined according to the application video coding standard.

For example, when K reference pixel sets are selected from the M candidate neighboring pixel sets 222[1]-222[M], K being a positive integer greater than 1, the K selected reference pixel sets may define K reference lines, respectively. A direction of prediction of the intra prediction mode of the current block may also define plural prediction reference lines. A value of a pixel of the intra predictor that overlaps one of the prediction reference lines may be generated by determining K sample values based on the K selected reference pixel sets, respectively, and calculating the value of the pixel of the intra predictor based on the K sample values. Each of the K sample values may correspond to a respective position where the respective reference line of the selected reference pixel sets and the one of the prediction reference line intersect. The value of the pixel of the intra predictor may be calculated based on K weightings applicable to the K sample values, respectively. In other words, the value of the pixel of the intra predictor can be determined based on an equation of:

$$P = W_1 \cdot \text{Ref1} + W_2 \cdot \text{Ref2} + \ldots + W_K \cdot \text{RefK},$$

where P represents the value of the pixel of the intra predictor, Ref1-RefK represent the respective sample values derived from the K selected reference pixel sets, and $W_1$-$W_K$ represent respective weightings applicable to the K selected reference pixel sets.

In some examples, the weightings $W_1$-$W_K$ may be determined based on a location of the pixel in the current block, the direction of prediction of the intra prediction mode of the current block, or a primary reference pixel set among the K selected reference pixel sets according to the applicable video coding standard. A weighting for a selected primary reference pixel set among the K selected reference pixel sets may be set to be the greatest among all weightings $W_1$-$W_K$. Also, a weighting for a selected reference pixel set that is closer to the corresponding edge of the current block 210 may be set to be greater than a weighting for another selected reference pixel set that is farther to the corresponding edge of the current block 210.

The selected reference pixel sets from the plural neighboring candidate reference pixel sets 222[1]-222[M] and/or 224[1]-224[N] may be used to generate the intra predictor according to various alternative approaches, or combinations thereof.

In accordance with one alternative approach of using the selected reference pixel sets, a raw intra predictor of the current block may be generated based on the neighboring reference pixel sets 222[1] and 224[1] closest to the corresponding edges 212 and 214, respectively, and the specified intra prediction mode. The raw intra predictor may be adjusted using gradient information calculated based on the selected reference pixel set(s) from the plural neighboring candidate pixel sets 222[1]-222[M] and/or 224[1]-224[N]. A final intra predictor may be generated by adjusting the raw intra predictor based on the calculated gradient information.

In some examples, the gradient information G may correspond to a difference between two sample values derived based on two selected reference pixel sets that correspond to a same edge along a direction of prediction of the specified intra prediction mode. When a value of a pixel of the raw intra predictor is Praw, a value of a pixel of the final intra predictor P that corresponds to Praw may be determined based on an equation of:

$$P = Praw + A \cdot G,$$

where A represents a predetermined parameter. In some examples, parameter A can be set to be greater when the predicted pixels are closer to the selected reference pixel sets. In at least another example, parameter A can vary with block sizes.

In at least one embodiment, the gradient information can be always generated by using the difference between the first and second closest reference pixel sets to a corresponding edge (e.g., candidate pixel sets 222[1] and 222[2] corresponding to upper edge 212 and/or candidate pixel sets 224[1] and 224[2] corresponding to left edge 214).

In accordance with another alternative approach of using the selected reference pixel sets, at most one reference pixel set is selected for a corresponding edge. When a horizontal reference pixel set and a vertical reference pixel set are selected for generating the intra predictor of the current block 210, a shortest distance between the selected horizontal reference pixel set and the upper edge 212 of the current block 210 may be different from a shortest distance between the vertical selected reference pixel set and the left edge 214 of the current block 210.

In accordance with yet another alternative approach of using the selected reference pixel sets, after generating a raw intra predictor as illustrated above, the final intra predictor of the current block may be generated by applying a gradient filter and/or a bi-boundary filter on the raw intra predictor. The filtering parameters for the gradient filter and/or a bi-boundary filter may be generated based on the selected horizontal reference pixel set(s) and/or the selected vertical reference pixel set(s) instead of using only the closest reference pixel sets (e.g., candidate pixel set 222[1] or 224[1]).

In accordance with yet another alternative approach of using the selected reference pixel sets, the generation of the intra predictor of the current block includes first calculating a pixel value of the lower-right corner pixel 216 of the intra predictor of the current block 210, which can be calculated based on the selected reference pixel sets. The pixel value of the lower-right corner pixel 216 may be determined based on the pixel values of pixel 226 from the candidate pixel set 222[1] directly above the corner pixel 216, the pixel values of pixel 228 from the candidate pixel set 224[1] directly to the left of the corner pixel 216, first gradient information Delta_T derived based on two or more selected reference pixel sets from the neighboring candidate pixel sets 222[1]-222[M], and second gradient information Delta_L derived based on two or more selected reference pixel sets from the neighboring candidate pixel sets 224[1]-224[N]. The pixel value P of the corner pixel 216 may be determined based on the equation of:

$$P = (Ref\_T + a \cdot Height \cdot Delta\_T + Ref\_L + b \cdot Width \cdot Delta\_L),$$

where Hight and Width correspond to the dimensions of the current block 210, and a and b represent predetermined parameters.

Parameters a and b can be determined based on a direction of prediction, a block size, a distance of the corner pixel 216 to the selected reference pixel sets, or the like. In some examples, parameters a and b can be signaled or derived, or selected from plural candidate values based on the direction of prediction and/or block size.

In some examples, a coarse value of the corner pixel 216 is signaled, and the final pixel value of the corner pixel 216 may be adjusted based on the gradient information derived from the selected reference pixel sets.

Although many example approaches for generating the intra predictor using the selected reference pixel sets are illustrated in this disclosure, other applicable approaches may be available and within the contemplated embodiments.

Moreover, in some examples, whether to select at least one reference pixel set that corresponds to a particular edge of the current block or to automatically use the reference pixel set that is closest to the corresponding edge instead may depend on whether a size of the edge if greater than a predetermined threshold. For example, when the edge has a size greater than a predetermined number of pixels, the generation of the intra predictor would be performed based on selecting at least one reference pixel sets from plural neighboring candidate reference pixel sets. In such scenario, which reference pixel set(s) to be selected may be signaled through the encoded video data 102 or derived based on the encoded video data 102. When the edge has a size equal to or less than the predetermined number of pixels, the generation of the intra predictor could be performed based the neighboring candidate pixel set that is closest to the corresponding edge. In such scenario, there would be no need to signal which reference pixel set(s) to be selected.

Also, whether to select at least one reference pixel sets that corresponds to a particular edge of the current block or to automatically use the neighboring candidate pixel set that is closest to the corresponding edge may depend on whether a size of an edge of a neighboring block adjacent to the edge and/or an area of the current block is greater than respective predetermined thresholds. Information indicating which reference pixel set(s) to be selected may be signaled through the encoded video data 102 or derived based on the encoded video data 102.

In some examples, when the current block is a chroma block, the selected reference pixel set(s) may be signaled or derived based on a selected reference pixel set for a luma block that corresponds to the chroma block. In some examples, when the current block is a chroma block, encoding or decoding the chroma block by selecting reference pixel set(s) as described above or using a reference pixel set that is immediately adjacent to an edge of the chroma block instead.

Moreover, when the frame where the current block belongs is coded using a quadtree plus binary tree (QTBT) structure, luma and chroma blocks of the frame may have different block divisions in different block sizes and/or shapes. The reference pixel set(s) for a chroma block may use the closest reference pixel set by default, refer to the reference pixel set selection of a corresponding luma block that includes a pixel co-located with the top-left corner pixel of the chroma block. In some examples, when using the 4:2:0 color format, the first and second closest reference pixel sets for a luma block may correspond to the first closest reference pixel set for a corresponding chroma block, and the third and fourth closest reference pixel sets for the luma block may correspond to the second closest reference pixel set for the corresponding chroma block. Of course, the chorma block may use separately signaled or derived reference pixel set selection.

Figure 3:
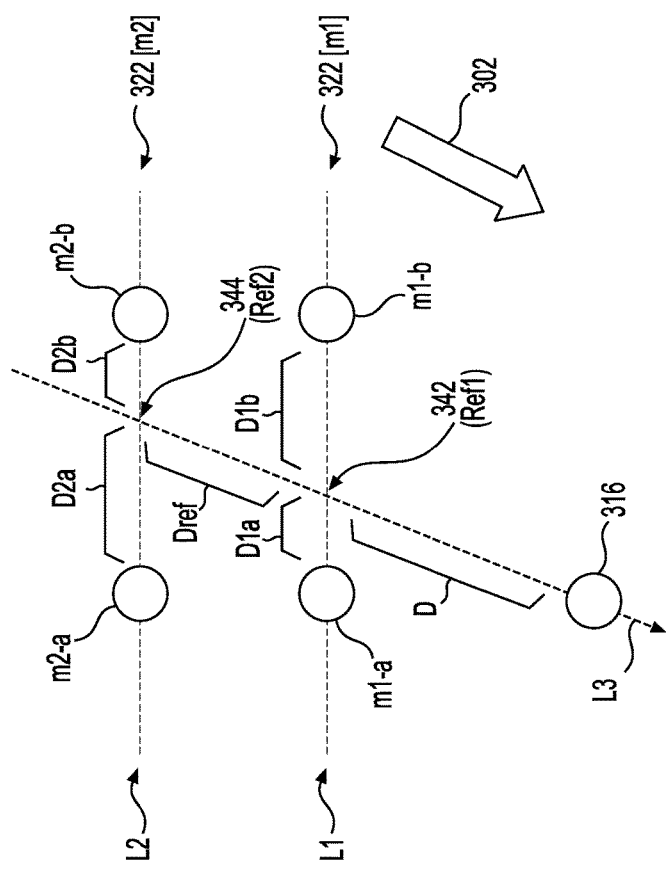
FIG. 3 shows a diagram illustrating calculating a value of a pixel of an intra predictor using two selected reference pixel sets according to an exemplary embodiment of the disclosure.

FIG. 3 shows a diagram illustrating calculating a value of a pixel of an intra predictor using two selected reference pixel sets 322[m1] and 322[m2] according to an exemplary embodiment of the disclosure. FIG. 3 shows a specific example of generating the intra predictor using reference pixel sets selected from plural neighboring pixel sets that has been briefly illustrated with reference to FIG. 2.

The selected reference pixel sets 322[m1] and 322[m2] are selected from the neighboring candidate pixel sets 222[1]-222[M] that are adjacent and in parallel with the upper edge 212 of the current block 210, and the indices m1 and m2 range from 1 to M. Of course, depending on the specified intra prediction mode for generating the intra predictor, the value of the pixel of the intra predictor may be calculated, additionally or alternatively, based on reference pixel sets selected from the neighboring candidate reference pixel sets 224[1]-224[N] in a manner similar to the example illustrated with reference to FIG. 3.

When two reference pixel sets 322[m1] and 322[m2] corresponding to a particular edge 212 are selected for generating the intra predictor, the intra predictor may be generated according to a weighted combination of sample values derived from the two selected reference pixel sets. The weighted combination may be performed in a form of a summation of a sample value derived from one of the two selected reference pixel sets and a different sample values derived from the two selected reference pixel sets that is adjusted by a predetermined multiplication factor.

For example, the selected reference pixel set 322[m1] may define a first reference line L1. The selected reference pixel set 322[m2] may define a second reference line L2. Also, the direction of prediction 302 of the specified intra prediction mode of the current block may define prediction reference lines, where one of the prediction reference lines L3 overlaps the pixel 316 of the intra predictor. A first sample value Ref1 may be determined based on the selected reference pixel set 322[m1]. The first sample value Ref1 may correspond to a first position 342 where the first reference line L1 and the prediction reference line L3 intersect. In some examples, the first sample value Ref1 can be determined by interpolation between pixel values of at least two pixels (e.g., pixels m1-a and m1-b) of the selected reference pixel set 322[m1] that are adjacent to the first position 342 using ratios that are inversely proportional to respective distances D1a and D1b between the first position and the at least two pixels. Also, a second sample value Ref2 may be determined based on the selected reference pixel set 322[m2]. The second sample value Ref2 corresponding to a second position 344 where the second reference line L2 and the prediction reference line L3 intersect. In some examples, the second sample value Ref2 can be determined by interpolation between pixel values of at least two pixels (e.g., pixels m2-a and m2-b) of the selected reference pixel set 322[m2] that are adjacent to the second position 344 using ratios that are inversely proportional to respective distances D2a and D2b between the second position and the at least two pixels. Of course, the sample values Ref1 and Ref2 can be determined by any other applicable methods based on the selected reference pixel sets 322[m1] and/or 322[m2].

The value of a pixel 316 of the intra predictor that overlaps the prediction reference line L3 may be calculated based on the first sample value Ref1 and second sample value Ref2. In some examples, the value of the pixel 316 may be calculated based on a difference between the first sample value Ref1 and the second sample value Ref2 and one of the first sample value and the second sample value Ref1 or Ref2. In at least one example, the value of the pixel of the intra predictor can be determined based on an equation of:

$$P = \text{Ref}1 + W \cdot (\text{Ref}1 - \text{Ref}2),$$

where P represents the value of the pixel of the intra predictor, and W represents a multiplication factor.

The multiplication factor W may be set based on a size or the intra prediction mode of the current block, or a location of the pixel 316 in the current block. In some examples, the multiplication factor W may be determined based on a distance D between the first position 342 and the pixel 316 and a distance Dref between the first position 342 and the second position 344. In at least one example, the value of the pixel of the intra predictor can be determined based on an equation of:

$$P = Ref1 + \frac{D}{Dref} \cdot B \cdot (Ref1 - Ref2),$$

where B represents another predetermined parameter. In some examples, the parameter B may be signaled via the encoded video data 102 or derived based on the information provided in the encoded video data 102.

Figure 4:
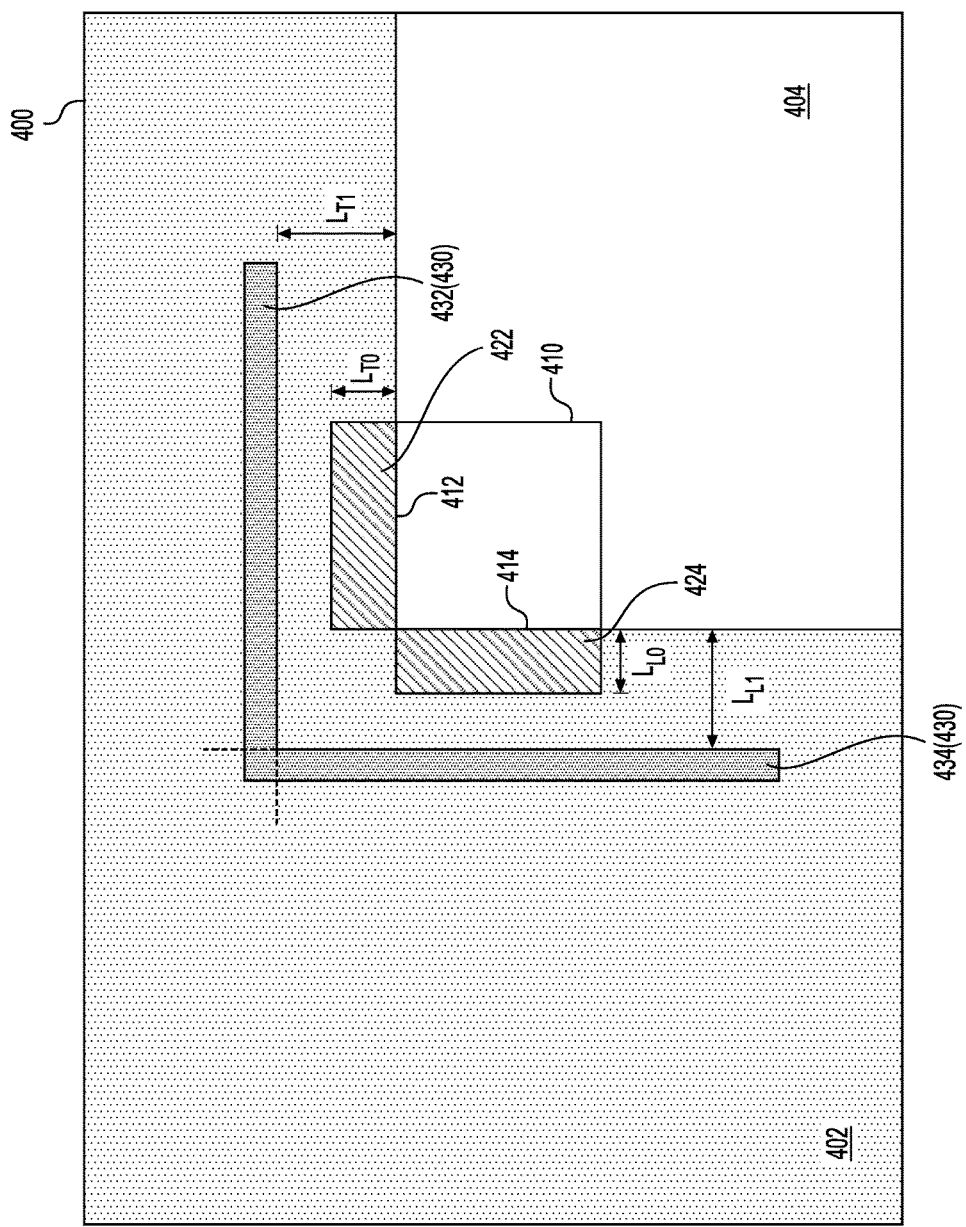
FIG. 4 shows a diagram illustrating selecting reference pixel sets from plural candidate neighboring pixel sets for deriving an intra prediction mode of the current block according to an exemplary embodiment of the disclosure.

FIG. 4 shows a diagram illustrating another approach of using the selected pixel sets, which includes selecting reference pixel sets from plural candidate neighboring pixel sets for deriving an intra prediction mode of a current block 410 according to an exemplary embodiment of the disclosure. The current block 410 is part of a frame 400, and the frame 400 includes a processed portion 402 and an unprocessed portion 404. The processed portion 402 includes block(s) that have been processed for encoding or decoding prior to processing the current block 410. The un-processed portion 404 includes block(s) that have not been processed for encoding or decoding, where the current block 410 is part of the un-processed portion 404.

The current block 410 includes an upper edge 412 and a left edge 414. One or more reference pixel sets 432 that correspond to the upper edge 412 and one or more reference pixel sets 434 that correspond to the left edge 414 are selected in a manner similar to selecting the reference pixel sets illustrated with references to FIG. 2. The selected reference pixel sets 432 and the selected reference pixel sets 434 are together labeled as selected reference pixel sets 430.

Instead of, or in addition to, being used directly to generate the intra predictor, the selected reference pixel sets 430 may be used in conjunction with the processed portion 402 of the frame 400 to derive an intra prediction mode of the current block 410. For example, the reference template pixels 422 within the processed portion 402 that are adjacent to the upper edge 412 and the reference template pixels 424 that that are adjacent to the left edge 414 may be used as a reference template that represent the current block 410. The reference template pixels 422 may have a width the same as the length of the upper edge 412 and a predetermined height $L_{T0}$. In some examples, the reference template pixels 422 may have a height $L_{T1}$ that is the same as the shortest distance between the selected reference pixel sets 432 and the upper edge 412. The reference template pixels 424 may have a width same as the length of the left edge 414 and a predetermined height $L_{L0}$. In some examples, the reference template pixels 424 may have a height $L_{Z1}$ that is the same as the shortest distance between the selected reference pixel sets 434 and the left edge 414.

The encoding circuit may thus exclude the information regarding the intra prediction mode of the current block from the encoded video data, and the decoding circuit may derive the intra prediction mode accordingly as described herein. The decoding circuit may derive the intra prediction mode by identifying an intra prediction mode that correspond to a minimum error between the decoded pixel values of the reference template pixels 422 and 424 and corresponding calculated pixel values using the selected reference pixel sets 430 and various candidate intra prediction modes. On the other hand, the encoding circuit may determine an intra prediction mode based on the pixel values of the reference template pixels 422 and 424 and corresponding calculated pixel values using the selected reference pixel sets 430 and various candidate intra prediction modes. In some examples, the encoding circuit may determine the intra prediction mode based on the current block 410 and various candidate intra prediction modes, and may further determine the selected reference pixel sets that may, in combination with the decoded pixel values of the reference template pixels 422 and 424, be used as an approach to signal the determined intra prediction mode.

Moreover, after the intra prediction mode is determined, the intra predictor of the current block 410 may be generated based on the same selected reference pixel sets 430 or different horizontal and/or vertical reference pixel sets.

Figure 5:
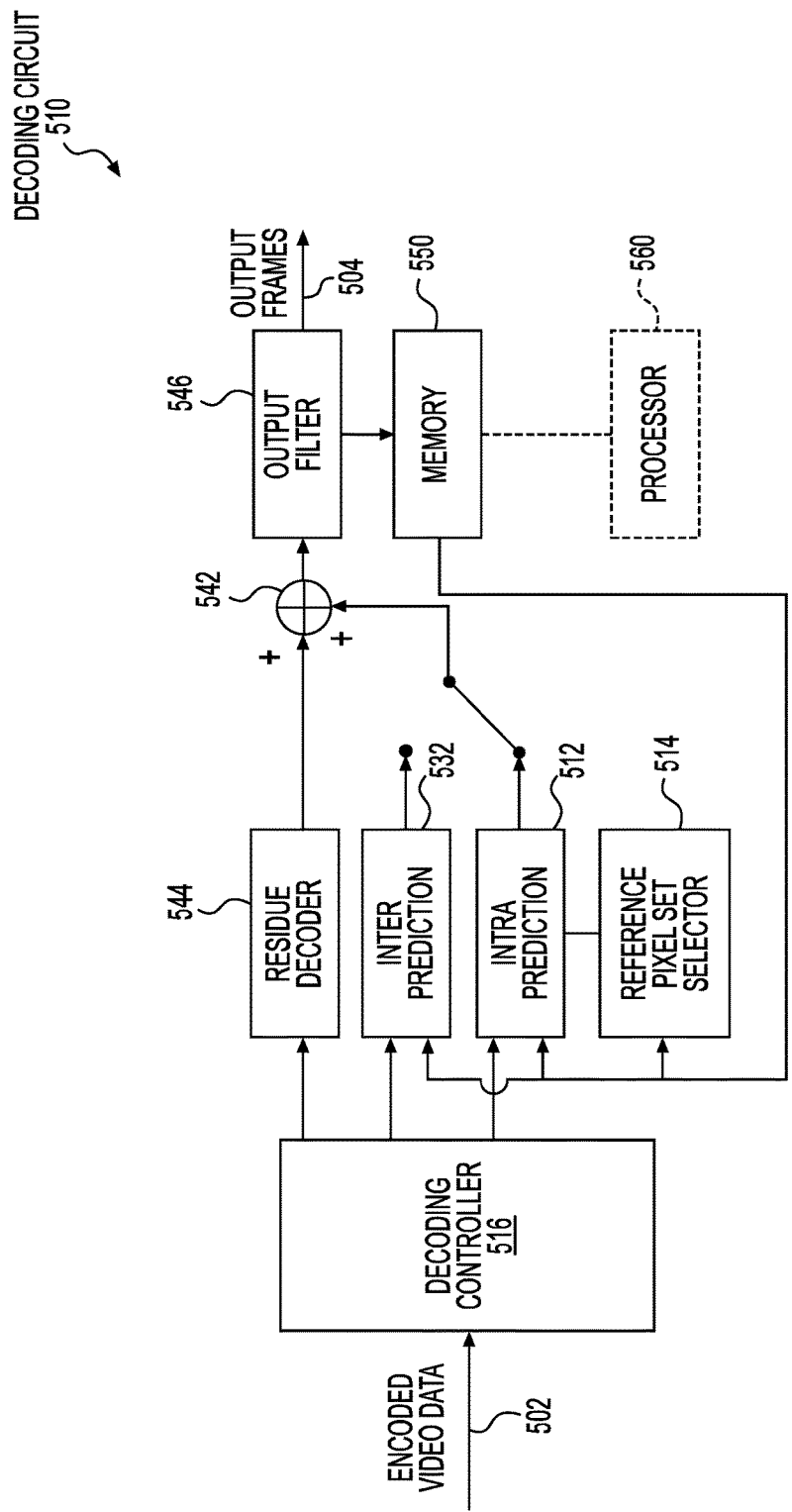
FIG. 5 shows a functional block diagram of an exemplary decoding circuit in the video coding system in FIG. 1 according to an embodiment of the disclosure.

FIG. 5 shows a functional block diagram of an exemplary decoding circuit 510 in a video coding system, such as the video coding system 100 in FIG. 1, according to an embodiment of the disclosure. FIG. 5 is a simplified illustration of the decoding circuit 510 and thus may not show all the details and variations of the decoding circuit 510.

The decoding circuit 510 includes an intra prediction module 512, a reference pixel set selector 514, and a decoding controller 516 that may correspond to the intra prediction module 112, the reference pixel set selector 114, and the decoding controller 116 in FIG. 1, respectively. The intra prediction module 512 may generate a final predictor of a current block based on a specified or derived intra prediction mode, should the decoding controller 516 determine that the current block is to be decoded using the intra prediction. The reference pixel set selector 514 may select horizontal and/or vertical reference pixel sets from plurality of neighboring candidate pixel sets as illustrated with reference to FIG. 2. In some examples, the intra prediction module 512 may generate the intra predictor based on the selected reference pixel sets and the intra prediction mode informed by the decoding controller 516 as illustrated with reference to FIGS. 2 and 3. In some examples, the intra prediction module 512 may derive the intra prediction mode based on the selected reference pixel sets as illustrated with reference to FIGS. 2 and 4.

The decoding circuit 510 also includes an inter prediction module 532, an adder 542, a residue decoder 544, an output filter 546, a memory 550, and a processor 560. The inter prediction module 532 may generate an inter predictor of the current block based on specified or derived motion information when the current block is to be decode using the inter prediction. Moreover, the residue decoder 544 can generate a residual portion of the current block according to the residue information from the decoding controller 516. The adder 542 may generate a decoded image of the current block (i.e., the decoded block) by adding the residual portion of the current block from the residue decoder 544, the intra predictor of the current block from the intra prediction module 512, and/or an inter predictor of the current block from the inter prediction module 532.

The output filter 546 can combine decoded blocks from the adder 542 into image frames, processes the image frames according to a predetermined filtering process, and output the filtered image frames as the output frames 504. The memory 550 can store filtered image frame from the output filter 546 and/or previously decoded blocks of a current frame from the prediction modules 512 or 532, which can be further used by the prediction modules 512 or 532 for retrieving reference samples.

The decoding controller 516 receives and analyzes the encoded video data 502 and extracts residue information and prediction parameters of the current block. The decoding controller 516 may provide the residue information to the residue decoder 544 and provide the prediction parameters to the intra prediction module 512 or the inter prediction module 532 in order to reconstruct the image of the current block.

In operation, when a current block is to be decoded, the decoding controller 516 receives the encoded video data 502 associated with the current block and extracts information with respect to whether the current block is to be decoded using the inter prediction or the intra prediction. When the decoding controller 516 determines that the current block is to be decoded using the intra prediction, the decoding controller 516 forwards the prediction parameters of the current block to the intra prediction module 512. The prediction parameters may include intra prediction information, such as reference pixel set selection information indicating which one(s) of neighboring candidate pixel sets are to be selected, a flag indicating whether an intra prediction mode for generating an intra predictor of the current block is to be signaled or derived, and/or the intra prediction mode. The prediction parameters extracted or identified by the decoding controller 516 may be explicitly specified in the encoded video data 502 or derived based on information provided in the encoded video data 502 and a predetermined video coding standard.

The intra prediction module 512 may generate the intra predictor of the current block according to the selected reference pixel sets and the intra prediction mode provided by the decoding controller 516 as described with reference to FIGS. 2 and 3. The intra prediction module 512 may derive the intra prediction mode of the current block according to the selected reference pixel sets and processed portion of the frame where the current block belongs, and generate the intra prediction mode based on the derived intra prediction mode as described with reference to FIGS. 2 and 4.

The decoding controller 516 also forwards the residue information to the residue decoder 544, where a residual portion of the current block is generated. The current block can now be decoded by adding the intra predictor from the intra prediction module 512 and the residual portion of the current block from the residue decoder 544 at the adder 542.

Moreover, as shown in FIG. 5, the processor 560 is electrically coupled with the memory 550 and can be configured to execute program instructions stored in the memory 550 to perform various functions. The processor 560 can include a single or multiple processing cores. Various components of the decoding circuit 510, such as the decoding controller 516, intra prediction module 512, reference pixel set selector 514, inter prediction module 532, adder 542, residue decoder 544, and/or output filter 546, may be implemented by hardware components, the processor 560 executing the program instructions, or a combination thereof. Of course, the processor 560 can also execute program instructions to control receiving of the encoded video data 502 and the output or display of the output frames 504. In some examples, the processor 560 can execute program instructions to perform functions that may not be directly related to decoding the encoded video data 502.

The memory 550 can be used to store the program instructions, information corresponding to the prediction parameters, previously decoded blocks, output frames, and/or intermediate data for performing various functions of the decoding circuit 510. In some examples, the memory 550 includes a non-transitory computer readable medium, such as a semiconductor or solid-state memory, a random access memory (RAM), a read-only memory (ROM), a hard disk, an optical disk, or other suitable storage medium. In some embodiments, the memory 550 includes a combination of two or more of the non-transitory computer readable mediums listed above.

Figure 6:
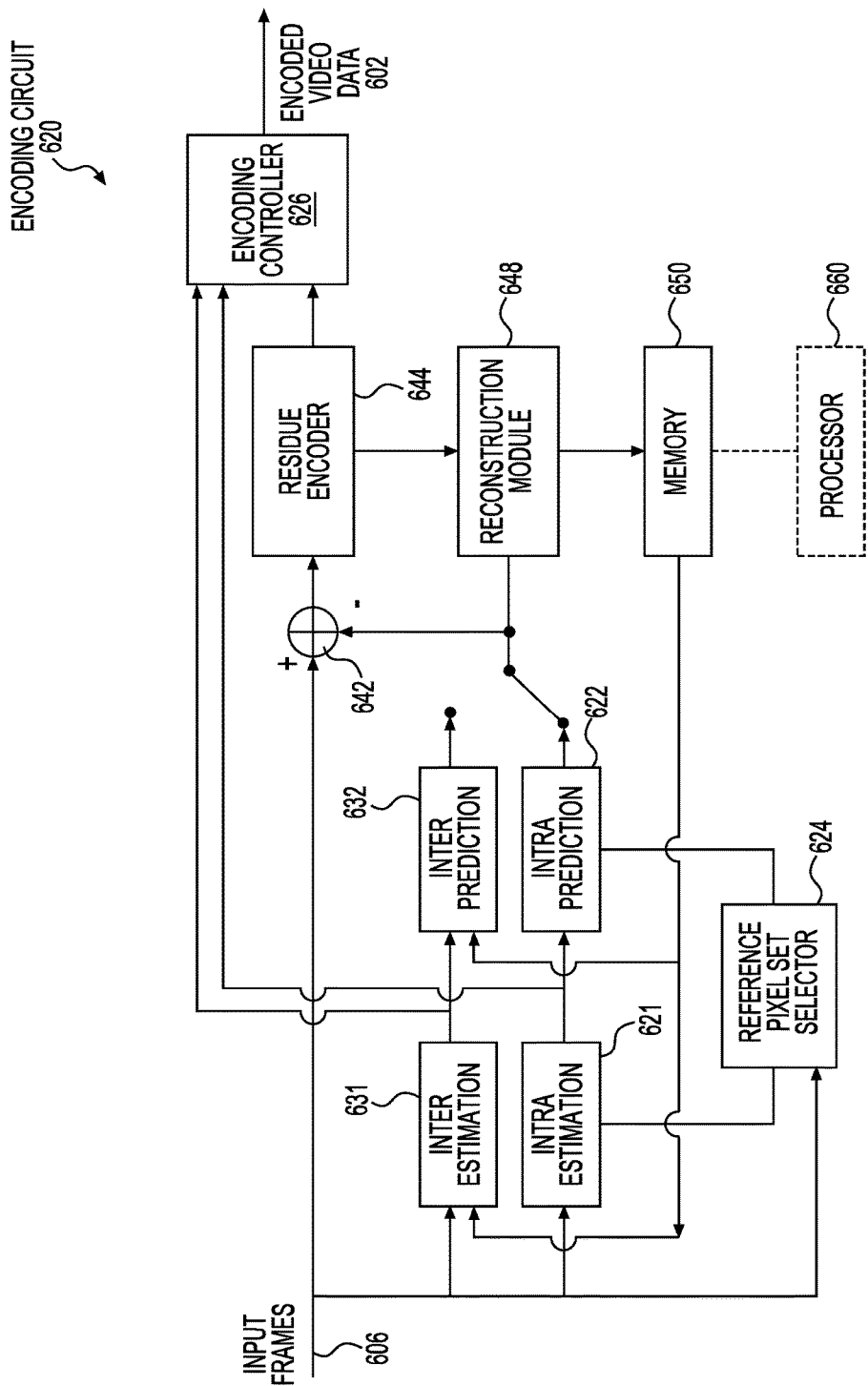
FIG. 6 shows an exemplary functional block diagram of a processing circuit for video encoding in the video coding system in FIG. 1 according to an embodiment of the disclosure.

FIG. 6 shows an exemplary functional block diagram of an encoding circuit 620 for video encoding in a video coding system, such as the video coding system 100 in FIG. 1 according to an embodiment of the disclosure. FIG. 6 is a simplified illustration of the encoding circuit 620 and thus may not show all the details and variations of the encoding circuit 620.

The encoding circuit 620 includes an intra estimation module 621, an intra prediction module 622, a reference pixel set selector 624, and an encoding controller 626 that may correspond to the intra estimation module 121, intra prediction module 122, reference pixel set selector 124, and encoding controller 126 in FIG. 1, respectively. The encoding circuit 620 also includes an inter estimation module 631, an inter prediction module 632, an adder 642, a residue encoder 644, a reconstruction module 648, a memory 650, and a processor 660.

The encoding controller 626 supervises the operation of the intra estimation module 621, intra prediction module 622, reference pixel set selector 624, inter estimation module 631, and inter prediction module 632. The encoding controller 626 may divide each input frame into blocks and instruct the intra estimation module 621 and/or inter estimation module 631 to determine the prediction scheme, prediction mode, and/or corresponding prediction parameters for each block. The encoding controller 626 may select one of the intra prediction module 622 or inter prediction module 632 to output a corresponding final predictor of a current block to the adder 642. The adder 642 receives an original image of the current block and the final predictor of the current block and outputs a residual portion of the current block by subtracting the final predictor from the original image of the current block. The residue encoder 644 receives and encodes the residual portion of the current block. The encoding controller 626 may generate the encoded video data 602 based on the prediction parameters from the intra estimation module 621 and/or inter estimation module 631 and the output from the residue encoder 644.

The intra prediction module 622 and inter prediction module 632 may receive prediction parameters from the intra estimation module 621 and inter estimation module 631, respectively, and may generate corresponding final predictors for the current block in a manner similar to the operations of the intra prediction module 512 and inter prediction module 532 in FIG. 5. The intra prediction module 622 and/or inter prediction module 632 may generate the final predictor in a manner similar to the operation of the intra prediction module 512 and the inter prediction module 532, respectively. Therefore, detailed description thereof is omitted.

In some examples, the encoding controller 626 may control the intra estimation module 621, reference pixel set selector 624, inter estimation module 631, intra prediction module 622, inter prediction module 632, and/or the residue encoder 644 to encode the current block based on different prediction schemes and parameters and then may select an optimal combination of encoding scheme and parameters for encoding the current block.

The reconstruction module 648 may receive the final predictor from the intra prediction module 622 or intra prediction module 632 and a reconstructed residual portion of the current block from the residue encoder 644. Based on such information, the reconstruction module 648 may generate a reconstructed image of the current block and/or reconstructed frames in a manner similar to the operations of the adder 542 and the output filter 546 in FIG. 5. The reconstructed blocks and/or frames can be stored in the memory 650 and are accessible by the intra prediction module 622, intra prediction module 632, intra estimation module 621, and/or intra estimation module 631 for estimating prediction parameters for a next block.

In operation, when a current block is to be encoded using intra prediction as instructed by the encoding controller 626, the intra estimation module 621 receives the original image of the current block from the input frames 606. The intra estimation module 621 may work with the reference pixel set selector 624 to determine suitable prediction parameters, such as a selected intra prediction mode and/or the selected reference pixel sets from neighboring candidate reference pixel sets as described with reference to FIGS. 2 and 3. The intra prediction mode for intra prediction may be selected from available intra prediction modes according to a predetermined video coding standard.

The intra prediction module 622 may generate an intra predictor of the current block based on the prediction parameters provide by the intra estimation module 624. The intra prediction module 622 may work with the reference pixel set selector 624 to generate the intra predictor of the current block according to selected reference pixel sets from neighboring candidate reference pixel sets and the intra prediction mode as described with reference to FIGS. 2 and 3. In some examples, the intra prediction module 622 may work with the neighboring reference pixel set selector 624 to derive the intra prediction mode according to the selected reference pixel sets from neighboring candidate reference pixel sets as described with reference to FIGS. 2 and 4, and generate the intra predictor of the current block according to the selected reference pixel sets, other predetermined neighboring reference pixel sets, and the derived intra prediction mode.

The adder 642 may output a residual portion of the current block based on the original image of the current block and the final predictor and encoded the residual portion. The encoding controller 626 may collect the prediction parameters from the inter estimation module 621 and/or inter estimation module 631 and the encoded residual information and determine whether the selected coding scheme for the current block is acceptable.

Moreover, as shown in FIG. 6, the processor 660 is electrically coupled with the memory 650 and can be configured to execute program instructions stored in the memory 650 to perform various functions. The processor 660 can include a single or multiple processing cores. Various components of the encoding circuit 620, such as the encoding controller 626, intra prediction module 622, intra estimation module 621, inter prediction module 632, inter estimation module 631, reference pixel set selector 624, adder 642, residue encoder 644, and/or reconstruction module 648, may be implemented by hardware components, the processor 660 executing the program instructions, or a combination thereof. Of course, the processor 660 can also execute program instructions to control receiving of the input frames 606 and the output of the encoded video data 602. In some examples, the processor 660 can execute program instructions to perform functions that may not be directly related to encoding the encoded video data 602.

The memory 650 can be used to store the program instructions, information corresponding to the prediction parameters reconstructed blocks, input frames, and/or intermediate data for performing various functions of the encoding circuit 620. In some examples, the memory 650 includes a non-transitory computer readable medium, such as a semiconductor or solid-state memory, a random access memory (RAM), a read-only memory (ROM), a hard disk, an optical disk, or other suitable storage medium. In some embodiments, the memory 650 includes a combination of two or more of the non-transitory computer readable mediums listed above.

Moreover, the decoding circuit 510 in FIG. 5 and the encoding circuit 620 in FIG. 6 may be implemented in the same electronic device, and various components of the decoding circuit 510 and the encoding circuit 620 may be shared or reused. For example, one or more of the memory 550, processor 560, intra prediction module 512, intra prediction module 532, neighboring reference pixel set selector 514, and output filter 546 in the decoding circuit 510 may also be used to function as the memory 650, processor 660, intra prediction module 622, intra prediction module 632, neighboring reference pixel set selector 624, and reconstruction module 648 in FIG. 6, respectively.

Figure 7:
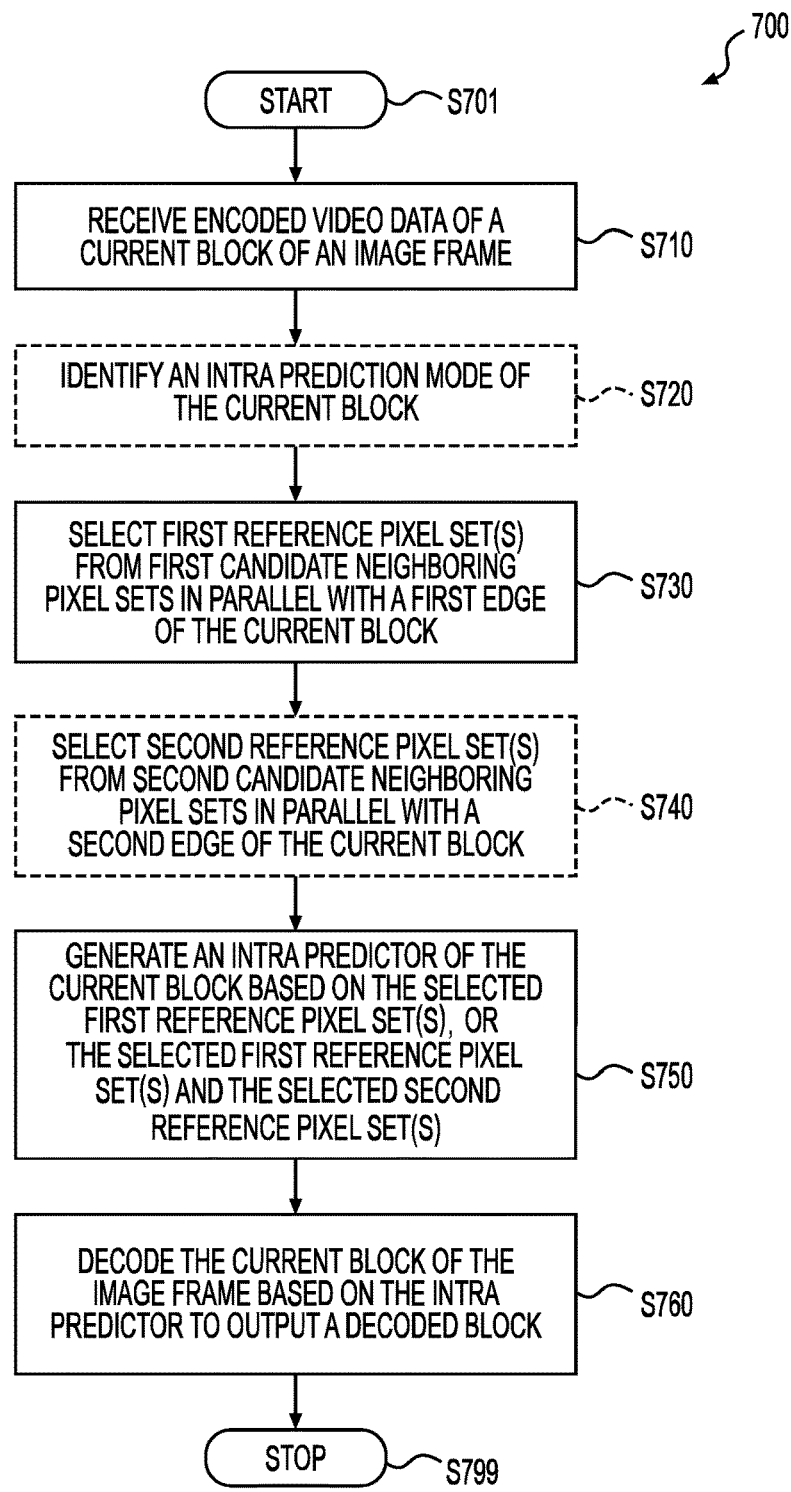
FIG. 7 shows a flow chart outlining an exemplary video decoding process using a processing circuit for video decoding, such as the processing circuit in FIG. 5, according to an embodiment of the disclosure.

FIG. 7 shows a flow chart outlining an exemplary video decoding process 700 using a processing circuit for video decoding, such as the decoding circuit 510 in FIG. 5, according to an embodiment of the disclosure. It is understood that additional operations may be performed before, during, and/or after the process 700 depicted in FIG. 7. The process 700 starts at S701 and proceeds to S710.

At S710, encoded video data associated with a current block in an image frame are received as input data. For example, the decoding controller 516 may receive the encoded video data 502 that includes the input data associated with the current block.

At S720, when the current block is encoded using an intra prediction, an intra prediction mode of the current block is identified. In some examples, the intra prediction mode may be signaled through the encoded video data or derived based on information provided in the encoded video data. The reference pixel set(s) to be selected in S730 and/or S740 together with the identified intra prediction mode may be used to generate the intra predictor of the current block. For example, the decoding controller 516 may extract prediction parameters from the encoded video data 502 and determines the intra prediction mode of the current block.

In some examples, the reference pixel set(s) to be selected in S730 and/or S740 may be used to derive the intra prediction mode of the current block. In such scenario, S720 may be performed after S730 and S740.

At S730, one or more first reference pixel sets are selected from first plurality of candidate neighboring pixel sets that are arranged in parallel with and adjacent to a first edge of the current block. For example, the reference pixel set selector 514 may either select one or more reference pixel sets from candidate neighboring pixel sets 222[1]-222[M] corresponding to the upper edge 212, or select one or more reference pixel sets from candidate neighboring pixel sets 224[1]-224[N] corresponding to the left edge 214 as the one or more first reference pixel sets as described with reference to FIG. 2.

At S740, one or more second reference pixel sets are selected from second plurality of candidate neighboring pixel sets that are arranged in parallel with and adjacent to a second edge of the current block. For example, the reference pixel set selector 514 may further select one or more reference pixel sets from the other candidate neighboring pixel sets 222[1]-222[M] or 224[1]-224[N] as the one or more second reference pixel sets as described with reference to FIG. 2.

S740 may be performed when the generation of the intra predictor requires selected reference pixel sets that correspond to two different edges of the current block. In some examples, when the selected reference pixel set(s) for the second edge of the current block has been pre-specified according to a predetermined video coding standard or when only the selected reference pixel sets from one of the upper edge or the left edge of the current block is needed, S740 may be omitted.

In some examples, the selected reference pixel set(s) in S730 and S740 may be used to derive the intra prediction mode of the current block. In such scenario, S720 may be performed after S730 and S740. For example, the intra prediction module 512, the reference pixel set selector 514, and the decoding controller 516 may work together to derive the intra prediction mode in a manner as described with reference to FIG. 4.

At S750, an intra predictor of the current block is generated using the identified intra prediction mode and/or the selected reference pixel set(s). For example, when the current block is encoded using the intra prediction, the intra prediction module 512 may generate the intra predictor of the current block using the selected reference pixel set(s) as described with reference to FIGS. 2 and 3 and/or using the identified intra prediction mode as described with reference to FIGS. 2 and 4.

At S760, the current block is decoded based on the intra predictor to output a decoded block. For example, the adder 542 generate a decoded block of the current block based on combining the residual portion of the current block and the final predictor from the intra-inter prediction module 512 as described with reference to FIG. 5.

After S760, the process proceeds to S799 and terminates.

Figure 8:
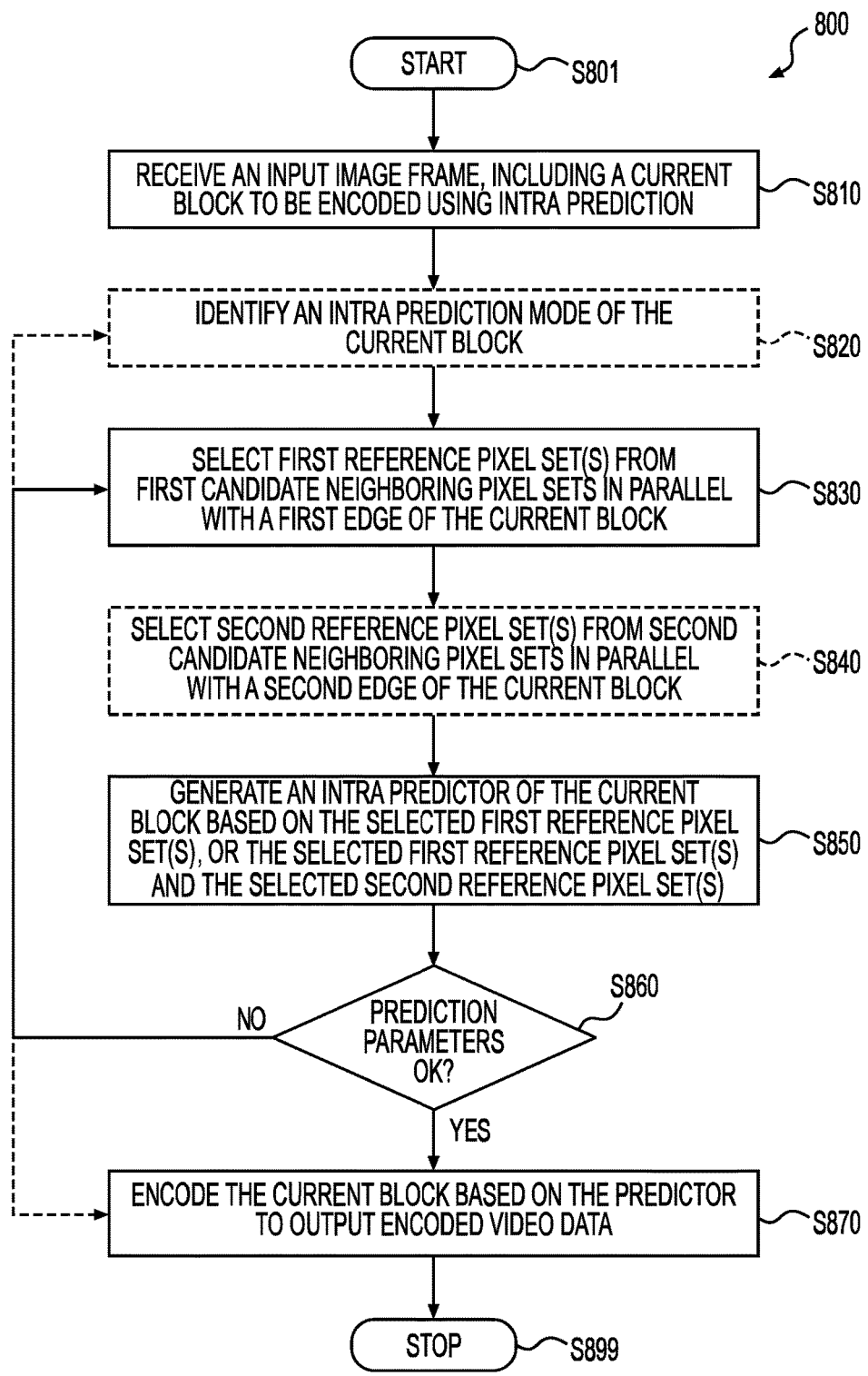
FIG. 8 shows a flow chart outlining an exemplary video encoding process using a processing circuit for video encoding, such as the processing circuit in FIG. 6, according to an embodiment of the disclosure.

FIG. 8 shows a flow chart outlining an exemplary video encoding process 800 using a processing circuit for video encoding, such as the encoding circuit 620 in FIG. 6, according to an embodiment of the disclosure. It is understood that additional operations may be performed before, during, and/or after the process 800 depicted in FIG. 8. The process 800 starts at S801 and proceeds to S810.

At S810, an input image frame including a current block to be encoded using an intra prediction is received as input data. For example, the processing circuit 620 may receive the input frames 606 that include the image frame having the current block.

At S820-S840, prediction parameters for encoding the current block using the intra-inter prediction are estimated. For example, the intra estimation module 621 together with the neighboring reference pixel set selector 624 estimate the prediction parameters for encoding the current block using the intra prediction as described with reference to FIGS. 2-4.

At S820, an intra prediction mode for encoding the current block is identified. At S830, one or more first reference pixel sets are selected from first plurality of candidate neighboring pixel sets that are arranged in parallel with and adjacent to a first edge of the current block. For example, the reference pixel set selector 624 may either select one or more reference pixel sets from candidate neighboring pixel sets 222[1]-222[M] corresponding to the upper edge 212, or select one or more reference pixel sets from candidate neighboring pixel sets 224[1]-224[N] corresponding to the left edge 214 as the one or more first reference pixel sets as described with reference to FIG. 2.

At S840, one or more second reference pixel sets are selected from second plurality of candidate neighboring pixel sets that are arranged in parallel with and adjacent to a second edge of the current block. For example, the reference pixel set selector 814 may further select one or more reference pixel sets from the candidate neighboring pixel sets 222[1]-222[M] or 224[1]-224[N] that correspond to the other one of edge 212 or 214 as the one or more second reference pixel sets as described with reference to FIG. 2.

S840 may be performed when the generation of the intra predictor requires selected reference pixel sets that correspond to two different edges of the current block. In some examples, when the selected reference pixel set(s) for the second edge of the current block has been pre-specified according to a predetermined video coding standard or when only the selected reference pixel sets from one of the upper edge or the left edge of the current block is needed, S840 may be omitted.

In some examples, the reference pixel set(s) to be selected in S830 and/or S840 may be used to derive the intra prediction mode of the current block. In such scenario, S820 may be performed after S830 and S840. For example, the intra estimation module 621, the reference pixel set selector 624, and the encoding controller 626 may work together to derive the intra prediction mode in a manner as described with reference to FIG. 4.

At S850, the intra predictor of the current block is generated based on the prediction parameters determined at S820-S840. For example, the intra prediction module 622, with the assistance of the reference pixel set selector 624, generates the intra predictor of the current block based on the prediction parameters provided by the intra estimation module 621 as described with reference to FIG. 6. In some examples, the intra prediction module 622 may generate the intra predictor of the current block using the selected reference pixel set(s) as described with reference to FIGS. 2 and 3 and/or using the identified intra prediction mode as described with reference to FIGS. 2 and 4.

At S860, whether the prediction parameters are acceptable is determined. If the prediction parameters are acceptable, the process proceeds to S870. If the prediction parameters are not acceptable, the process may proceed to S820 or S830 to determine an alternative intra prediction mode or alternative selected reference pixel set(s) or proceed to S899 such that the current block may be encoded using a different prediction scheme. For example, the encoding controller 626 receives the prediction parameters estimated by the intra estimation module 621 and the encoded residue information from the residue encoder 644, which is generated based on the intra predictor from the intra prediction module 622. The encoding controller 626 may determine whether the prediction parameters and the encoded residue information are acceptable based on predetermined encoding criteria and determine whether the intra-inter estimation module would have to provide a different set of estimated prediction parameters and/or whether to use only the intra prediction or inter prediction.

At S870, the current block is encoded based on the intra predictor and the estimated prediction parameters to output encoded video data. In some examples, the current block is encoded by encoding the prediction parameters from S820-S840 and the residue information that is generated based on subtracting the final predictor from an original image of the current block. For example, the adder 642 generates the residue information of the current block, the residue encoder 644 generates the encoded residue information, and encoding controller 626 generates the encoded video data based on the prediction parameters from the intra prediction module 621 and the encoded residue information from the residue encoder as described with reference to FIG. 6. In some examples, the prediction parameters may include an intra prediction mode, information specifying whether to select reference pixel set(s) from plural neighboring candidate sets, and/or the selected reference pixel set(s). The prediction parameters may be signaled or derived as described with reference to FIGS. 2-4.

After S870, the process proceeds to S899 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of video coding, comprising:
receiving input data associated with a current block in an image frame;
selecting a plurality of reference pixel sets from a plurality of first candidate neighboring pixel sets adjacent to a first edge of the current block, each of the first candidate neighboring pixel sets being arranged in parallel with the first edge of the current block;
generating an intra predictor of the current block based on a plurality of sample values respectively derived from the selected reference pixel sets and an intra prediction mode of the current block; and
encoding or decoding the current block based on the intra predictor to output encoded video data or a decoded block,
wherein
the selected reference pixel sets from the plurality of first candidate neighboring pixel sets adjacent to the first edge of the current block are K selected reference pixel sets, K being a positive integer greater than one,
the K selected reference pixel sets define K reference lines, respectively,
a direction of prediction of the intra prediction mode of the current block defines prediction reference lines, and
the generating the intra predictor includes:
determining K sample values based on the K selected reference pixel sets, respectively, each of the K sample values corresponding to a respective position where the respective reference line and one of the prediction reference lines intersect; and
calculating a value of a pixel of the intra predictor that overlaps the one of the prediction reference lines based on the K sample values and K weightings applicable to the K sample values, respectively.

2. The method according to claim 1, further comprising extracting from the input data or including in the encoded video data information that indicates the selected reference pixel sets.

3. The method according to claim 1, further comprising deriving the selected reference pixel sets based on the intra prediction mode or a shape of the current block.

4. The method according to claim 1, wherein the determining K sample values comprises:
   determining a first sample value based on a first reference pixel set of the K selected reference pixel sets by interpolation using pixel values of at least two pixels of the first reference pixel set that are adjacent to a first position where a first reference line defined by the first reference pixel set and the one of the prediction reference lines intersect.

5. The method according to claim 1, wherein the selecting the plurality of reference pixel sets from the first candidate neighboring pixel sets comprises selecting a closest one of the first candidate neighboring pixel sets to the first edge of the current block.

6. The method according to claim 1, further comprising extracting from the input data or including in the encoded video data information that indicates the K weightings.

7. The method according to claim 1, further comprising determining the K weightings based on a location of the pixel in the current block, the direction of prediction of the intra prediction mode of the current block, or a primary reference pixel set among the K selected reference pixel sets.

8. The method according to claim 1, further comprising:
   selecting another plurality of reference pixel sets from a plurality of second candidate neighboring pixel sets adjacent to a second edge of the current block, each set of the second candidate neighboring pixel sets being arranged in parallel with the second edge of the current block and not in parallel with the first edge of the current block,
   wherein
   generating the intra predictor of the current block is further based on the another plurality of selected reference pixel sets.

9. The method according to claim 8, wherein
   the first edge is an upper edge of the current block,
   the second edge is a left edge of the current block, and
   a shortest distance between the plurality of selected reference pixel sets and the upper edge of the current block is different from a shortest distance between the another plurality of selected reference pixel sets and the left edge of the current block.

10. The method according to claim 1, wherein generating the intra predictor comprises:
    generating a raw intra predictor;
    calculating gradient information based on the selected reference pixel sets; and
    adjusting the raw intra predictor to become a final intra predictor based on the calculated gradient information.

11. The method according to claim 1, further comprising deriving the intra prediction mode of the current block based on the selected reference pixel sets.

12. The method according to claim 1, wherein
    the current block is a chroma block, and
    the method further comprises deriving the selected reference pixel sets based on selected reference pixel sets for a luma block that corresponds to the chroma block.

13. The method according to claim 1, wherein
    the current block is a luma block, and
    the method further comprises encoding or decoding a chroma block that corresponds to the luma block using a neighboring reference pixel set that is immediately adjacent to an edge of the chroma block.

14. The method according to claim 1, wherein information indicating the selected reference pixel sets is incorporated in the encoded video data only if the current block has a block size greater than a predetermined block size.

15. A video coding apparatus, comprising:
    a processing circuit configured to:
      receive input data associated with a current block in an image frame;
      select a plurality of reference pixel sets from a plurality of candidate neighboring pixel sets adjacent to a first edge of the current block, each of the candidate neighboring pixel sets being arranged in parallel with the first edge of the current block;
      generate an intra predictor of the current block based on a plurality of sample values respectively derived from the selected reference pixel sets and an intra prediction mode of the current block; and
      encode or decode the current block based on the intra predictor to output encoded video data or a decoded block,
    wherein
    the selected reference pixel sets from the plurality of first candidate neighboring pixel sets adjacent to the first edge of the current block are K selected reference pixel sets, K being a positive integer greater than one,
    the K selected reference pixel sets define K reference lines, respectively,
    a direction of prediction of the intra prediction mode of the current block defines prediction reference lines, and
    the processing circuit is further configured to:
      determine K sample values based on the K selected reference pixel sets, respectively, each of the K sample values corresponding to a respective position where the respective reference line and one of the prediction reference lines intersect; and
      calculate value of a pixel of the intra predictor that overlaps the one of the prediction reference lines based on the K sample values and K weightings applicable to the K sample values, respectively.

16. A non-transitory computer readable medium storing program instructions for causing a processing circuit of an apparatus to perform a video coding method, and the method comprising:
    receiving input data associated with a current block in an image frame;
    selecting a plurality of reference pixel sets from a plurality of candidate neighboring pixel sets adjacent to a first edge of the current block, each of the candidate neighboring pixel sets being arranged in parallel with the first edge of the current block;
    generating an intra predictor of the current block based on a plurality of sample values respectively derived from the selected reference pixel sets and an intra prediction mode of the current block; and
    encoding or decoding the current block based on the intra predictor to output encoded video data or a decoded block,
    wherein
    the selected reference pixel sets from the plurality of first candidate neighboring pixel sets adjacent to the first edge of the current block are K selected reference pixel sets, K being a positive integer greater than one, the K selected reference pixel sets define K reference lines, respectively, a direction of prediction of the intra prediction mode of the current block defines prediction reference lines, and the generating the intra predictor includes:

determining K sample values based on the K selected reference pixel sets, respectively, each of the K sample values corresponding to a respective position where the respective reference line and one of the prediction reference lines intersect; and calculating a value of a pixel of the intra predictor that overlaps the one of the prediction reference lines based on the K sample values and K weightings applicable to the K sample values, respectively.

17. The non-transitory computer readable medium of claim 16, wherein the method further comprises selecting another plurality of reference pixel sets from a plurality of second candidate neighboring pixel sets adjacent to a second edge of the current block, each set of the second candidate neighboring pixel sets being arranged in parallel with the second edge of the current block and not in parallel with the first edge of the current block, and the generating the intra predictor of the current block is further based on the another plurality of selected reference pixel sets.

18. The non-transitory computer readable medium of claim 17, wherein the first edge is an upper edge of the current block, the second edge is a left edge of the current block, and a shortest distance between the plurality of selected reference pixel sets and the upper edge of the current block is different from a shortest distance between the another plurality of selected reference pixel sets and the left edge of the current block.

19. The video coding apparatus of claim 15, wherein the processing circuit is further configured to:

select another plurality of reference pixel sets from a plurality of second candidate neighboring pixel sets adjacent to a second edge of the current block, each set of the second candidate neighboring pixel sets being arranged in parallel with the second edge of the current block and not in parallel with the first edge of the current block; and generate the intra predictor of the current block further based on the another plurality of selected reference pixel sets.

20. The video coding apparatus of claim 19, wherein the first edge is an upper edge of the current block, the second edge is a left edge of the current block, and a shortest distance between the plurality of selected reference pixel sets and the upper edge of the current block is different from a shortest distance between the another plurality of selected reference pixel sets and the left edge of the current block.

* * * * *